United States Patent
Huang et al.

(10) Patent No.: US 10,897,617 B2
(45) Date of Patent: Jan. 19, 2021

(54) ROUNDING OF MOTION VECTORS FOR ADAPTIVE MOTION VECTOR DIFFERENCE RESOLUTION AND INCREASED MOTION VECTOR STORAGE PRECISION IN VIDEO CODING

(71) Applicant: QUALCOMM Incorporated, San Diego, CA (US)

(72) Inventors: Han Huang, San Diego, CA (US); Wei-Jung Chien, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/514,326

(22) Filed: Jul. 17, 2019

(65) Prior Publication Data

US 2020/0036980 A1     Jan. 30, 2020

Related U.S. Application Data

(60) Provisional application No. 62/702,737, filed on Jul. 24, 2018.

(51) Int. Cl.
*H04N 19/00* (2014.01)
*H04N 19/139* (2014.01)
(Continued)

(52) U.S. Cl.
CPC ........... *H04N 19/139* (2014.11); *H04N 19/11* (2014.11); *H04N 19/132* (2014.11); *H04N 19/176* (2014.11); *H04N 19/46* (2014.11)

(58) Field of Classification Search
CPC .... H04N 19/132; H04N 19/11; H04N 19/139; H04N 19/423; H04N 19/52; H04N 19/176; H04N 19/61; H04N 19/46
See application file for complete search history.

(56) References Cited

U.S. PATENT DOCUMENTS

2015/0195562 A1* 7/2015 Li ................. H04N 19/56
375/240.02
2016/0337662 A1* 11/2016 Pang ............... H04N 19/176
2017/0339426 A1* 11/2017 Lee ................ H04N 19/51

FOREIGN PATENT DOCUMENTS

EP       3203743 A1     8/2017

OTHER PUBLICATIONS

Bossen F., et al., "JEM Software Manual," Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.
(Continued)

*Primary Examiner* — Zhihan Zhou
(74) *Attorney, Agent, or Firm* — Schumaker & Sieffert, P.A.

(57) ABSTRACT

An example method includes coding a value of a motion vector difference (MVD) for a current block of video data; obtaining, from a motion vector (MV) buffer, a value of a motion vector predictor (MVP) for the current block of video data; determining a resolution of the value of the MVD for the current block; obtaining a storage resolution shift amount for MVs; rounding, based on the storage resolution shift amount, the value of the MVD obtained from the MV buffer directly to the resolution of the value of the MVD; adding the rounded value of the MVP to the value of the MVD to obtain a value of a MV for the current block; obtaining, based on the MV for the current block, samples of a predictor block for the current block; and reconstructing samples of the current block based on the samples of the predictor block.

27 Claims, 6 Drawing Sheets

(51) Int. Cl.
  *H04N 19/11* (2014.01)
  *H04N 19/46* (2014.01)
  *H04N 19/132* (2014.01)
  *H04N 19/176* (2014.01)

(56) References Cited

OTHER PUBLICATIONS

Bross B., et al., "Versatile Video Coding (Draft 2)", 11. JVET Meeting; Jul. 11, 2018-Jul. 18, 2018; Ljubljana; (The Joint Video Exploration Team of ISO/IEC JTC1/SC29/WG11 and ITU-T SG.16), No. JVET-K1001, Sep. 21, 2018 (Sep. 21, 2018), 68 Pages, XP030193577, Retrieved from the Internet: URL: http://phenix.int-evry.fr/jvet/doc_end_user/documents/11_Ljubljana/wg11/JVET-K1001-v6.zip JVET-K1001-v6.docx [retrieved on Sep. 21, 2018] sections 8.3.2.9, 8.3.2.14, 8.3.3.4, 8.3.3.6; p. 2, lines 15-19.
Bross B., et al., "Versatile Video Coding (Draft 5)", Joint Video Experts Team (JVET) of ITU-T SG 16 WP 3 and ISO/IEC JTC 1/SC 29/WG 11, 14th Meeting: Geneva, CH, Mar. 19-27, 2019, JVET-N1001-v3, 371 pages.
Chen J., et al., "Algorithm Description of Joint Exploration Test Model 1", Joint Video Exploration Team (JVET) of ITU-T SG 16 WP 3 and ISO/IEC JTC 1/SC 29/WG 11, 1nd Meeting: Geneva, CH, Oct. 19-21, 2015, 27 Pages, JVET-A1001.
Chen J., et al., JVET-G1001-V1 "Algorithm Description of Joint Exploration Test Model 7 (JEM7)", Joint Video Exploration Team (JVET)of ITU-T SG 16 WP 3 and ISO/IEC JTC 1/SC 29/WG 11, 7th Meeting, Jul. 13, 2017-Jul. 21, 2017, Torino, Aug. 19, 2017 (Aug. 19, 2017), 51 Pages, XP030150980, pp. i-iv, Retrieved from the Internet: URL: http://phenix.int-evry.fr/jvet/doc_end_user/documents/7_Torino/wg11/JVET-G0001-v1.zip, p. 20, Paragraph 2.3.7—p. 23, Paragraph 2.3.7.6, p. 17, Paragraph 2.3.5—p. 18, section 2.
Chuang T-D., et al., "CE4-Related: MV Rounding Unification", Joint Video Experts Team (JVET) of ITU-T SG 16 WP 3 and ISO/IEC JTC 1/SC 29/WG 11, JVET-N0085-v1, Mar. 19-27, 2019, 3 pages.
Ergen S., "ZigBee/IEEE 802.15.4 Summary", Sep. 10, 2004, 37 pp.
IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.
International Search Report and Written Opinion—PCT/US2019/042401—ISA/EPO—dated Nov. 18, 2019.
ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.
ITU-T H.265, Series H: Audiovisual and Multimedia Systems, Infrastructure of audiovisual services—Coding of moving video, Advanced video coding for generic audiovisual services, The International Telecommunication Union. Dec. 2016, 664 pp.
Pham Van (Qualcomm) L., et al., "CE2-related: 4x4 Chroma Affine Motion Compensation and Motion Vector Rounding Unification", 13. JVET Meeting; Jan. 9, 2019-Jan. 18, 2019; Marrakech; (The Joint Video Exploration Team of ISO/IEC JTC1/SC29/WG11 and ITU-T SG.16), No. JVET-M0462, Jan. 3, 2019, XP030200507, 4 pages, Retrieved from the Internet: URL: http://phenix.int-evry.fr/jvet/doc_end_user/documents/13_Marrakech/wg11/JVET-M0462-v1.zip JVET-M0462.docx [retrieved on Jan. 3, 2019] section 2.1.
Xiu X., et al., "CE2/4-Related: Unification of MV Rounding", Joint Video Experts Team (JVET) of ITU-T SG 16 WP 3 and ISO/IEC JTC 1/SC 29/WG 11, JVET-N0335, Mar. 19-27, 2019, 3 pages.
Xiu X., et al., "Draft Text for Advanced Temporal Motion Vector Prediction (ATMVP) and Adaptive Motion Vector Resolution (AMVR)", 11. JVET Meeting; Jul. 11, 2018-Jul. 18, 2018; Ljubljana; (The Joint Video Exploration Team of ISO/IEC JTC1/SC29/WG11 and ITU-T SG.16), No. JVET-K0566, Jul. 18, 2018 (Jul. 18, 2018), 34 Pages, XP030200046, Retrieved from the Internet: URL:http://phenix.int-evry.fr/jvet/doc_end_user/documents/11_Ljubljana/wg11/JVET-K0566-v4.zip JVET-K0566_v3(ATMVP+AMVR).docx [retrieved on Jul. 18, 2018] abstract, sections 7.3.4.5, 7.3.4.8.
Zhang K., et al., "AHG16: Clean-up on MV Rounding", Joint Video Experts Team (JVET) Joint Video Experts Team (JVET), JVET-M0265, Jan. 9-18, 2019, 2 pages.
Zhang (Qualcomm) Y., et al., "Rounding Align of Adaptive Motion Vector Resolution", 12. JVET Meeting; Oct. 3, 2018-Oct. 12, 2018; Macao; (The Joint Video Exploration Team of ISO/IEC JTC1/SC29/WG11 and ITU-T SG.16), No. JVET-L0377, Oct. 6, 2018 (Oct. 6, 2018), pp. 1-2, XP030195102, Retrieved from the Internet: URL: http://phenix.int-evry.fr/jvet/doc_end_user/documents/12_Macao/wg11/JVET-L0377-v3.zip JVET-L0377-AMVR MV Rounding Align_v2.docx [retrieved on Oct. 6, 2018] the whole document.
Zhou Y., et al., "Motion Vector Resolution Control for Screen Content Coding", 16. JCT-VC Meeting; Jan. 9, 2014-Jan. 17, 2014; San Jose; (Joint Collaborative Team on Video Coding of ISO/IEC JTC1/SC29/WG11 and ITU-T SG.16); URL: http://wftp3.itu.int/av-arch/jctvc-site/, No. JCTVC-P0277, Jan. 9, 2014 (Jan. 9, 2014), pp. 1-5, XP030115825, sections 2.1 and 2.2.

* cited by examiner

ROUNDING OF MOTION VECTORS FOR ADAPTIVE MOTION VECTOR DIFFERENCE RESOLUTION AND INCREASED MOTION VECTOR STORAGE PRECISION IN VIDEO CODING

This application claims the benefit of U.S. Provisional Application No. 62/702,737 filed Jul. 24, 2018, the entire content of which is incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for reducing error incurred when rounding motion vectors in video coding. A video decoder may determine a motion vector for a block by adding a motion vector difference (MVD) to a motion vector predictor (MVP). The MVD may be signalled in the bitstream by a video encoder and the MVP may be the motion vector of a previously coded block. When using adaptive motion vector resolution (e.g., AMVR or local AMVR (LAMVR)), the video encoder may signal MVDs using various resolutions (e.g., quarter luma sample precision, integer luma sample precision, or for luma sample precision). Additionally, the video decoder may store determined motion vectors at an increased resolution (e.g., over a default resolution/default unit). As the motion vectors (which are used as MVPs), the MVDs, and the default resolution may all be different, the video decoder may perform multiple rounding operations when calculating motion vectors, which may introduce error.

In accordance with one or more techniques of this disclosure, a video coder (e.g., a video encoder or a video decoder) may perform a joint rounding process when determining motion vectors. For instance, as opposed to first rounding a MVP from storage resolution to the default unit and then rounding the result to the resolution of the MVD (e.g., as the storage resolution is different that the resolution of the MVD), the video coder may round the MVP once based on the resolution of the MVD and the storage resolution. In this way, the video coder may reduce the error introduced when determining motion vectors. By reducing the error introduced, the video coder may reduce the number of bits required to represent the video data, yielding improved compression.

As one example, a method includes coding a value of a motion vector difference for a current block of video data; obtaining, from a motion vector buffer, a value of a motion vector predictor for the current block of video data; determining a resolution of the value of the motion vector difference for the current block; obtaining a storage resolution shift amount for motion vectors; rounding, based on the storage resolution shift amount, the value of the motion vector predictor obtained from the motion vector buffer directly to the resolution of the value of the motion vector difference; adding the rounded value of the motion vector predictor to the value of the motion vector difference to obtain a value of a motion vector for the current block; obtaining, based on the motion vector for the current block, samples of a predictor block for the current block; and reconstructing samples of the current block based on the samples of the predictor block for the current block.

As another example, a video coding device includes a memory configured to store video data; and one or more processing units implemented in circuitry and configured to: code a value of a motion vector difference for a current block of video data; obtain, from a motion vector buffer, a value of a motion vector predictor for the current block of video data; determine a resolution of the value of the motion vector difference for the current block; obtain a storage resolution shift amount for motion vectors; round, based on the storage resolution shift amount, the value of the motion vector predictor obtained from the motion vector buffer directly to the resolution of the value of the motion vector difference; add the rounded value of the motion vector predictor to the value of the motion vector difference to obtain a value of a motion vector for the current block; obtain, based on the motion vector for the current block, samples of a predictor block for the current block; and reconstruct samples of the current block based on the samples of the predictor block for the current block.

As another example, a video coding device includes means for coding a value of a motion vector difference for a current block of video data; means for obtaining, from a motion vector buffer, a value of a motion vector predictor for the current block of video data; means for determining a resolution of the value of the motion vector difference for the current block; means for obtaining a storage resolution shift amount for motion vectors; means for rounding, based on the storage resolution shift amount, the value of the motion vector predictor obtained from the motion vector buffer directly to the resolution of the value of the motion vector difference; means for adding the rounded value of the motion vector predictor to the value of the motion vector difference to obtain a value of a motion vector for the current block; means for obtaining, based on the motion vector for the current block, samples of a predictor block for the current block; and means for reconstructing samples of the current block based on the samples of the predictor block for the current block.

As another example, a computer-readable storage medium stores instructions that, when executed, cause one or more processors to: code a value of a motion vector difference for a current block of video data; obtain, from a motion vector buffer, a value of a motion vector predictor for the current block of video data; determine a resolution of the value of the motion vector difference for the current block; obtain a storage resolution shift amount for motion vectors; round, based on the storage resolution shift amount, the value of the motion vector predictor obtained from the motion vector buffer directly to the resolution of the value of the motion vector difference; add the rounded value of the motion vector predictor to the value of the motion vector difference to obtain a value of a motion vector for the current block; obtain, based on the motion vector for the current block, samples of a predictor block for the current block; and reconstruct samples of the current block based on the samples of the predictor block for the current block.

The details of one or more examples are set forth in the accompanying drawings and the description below. Other features, objects, and advantages will be apparent from the description, drawings, and claims.

DETAILED DESCRIPTION

Figure 1:
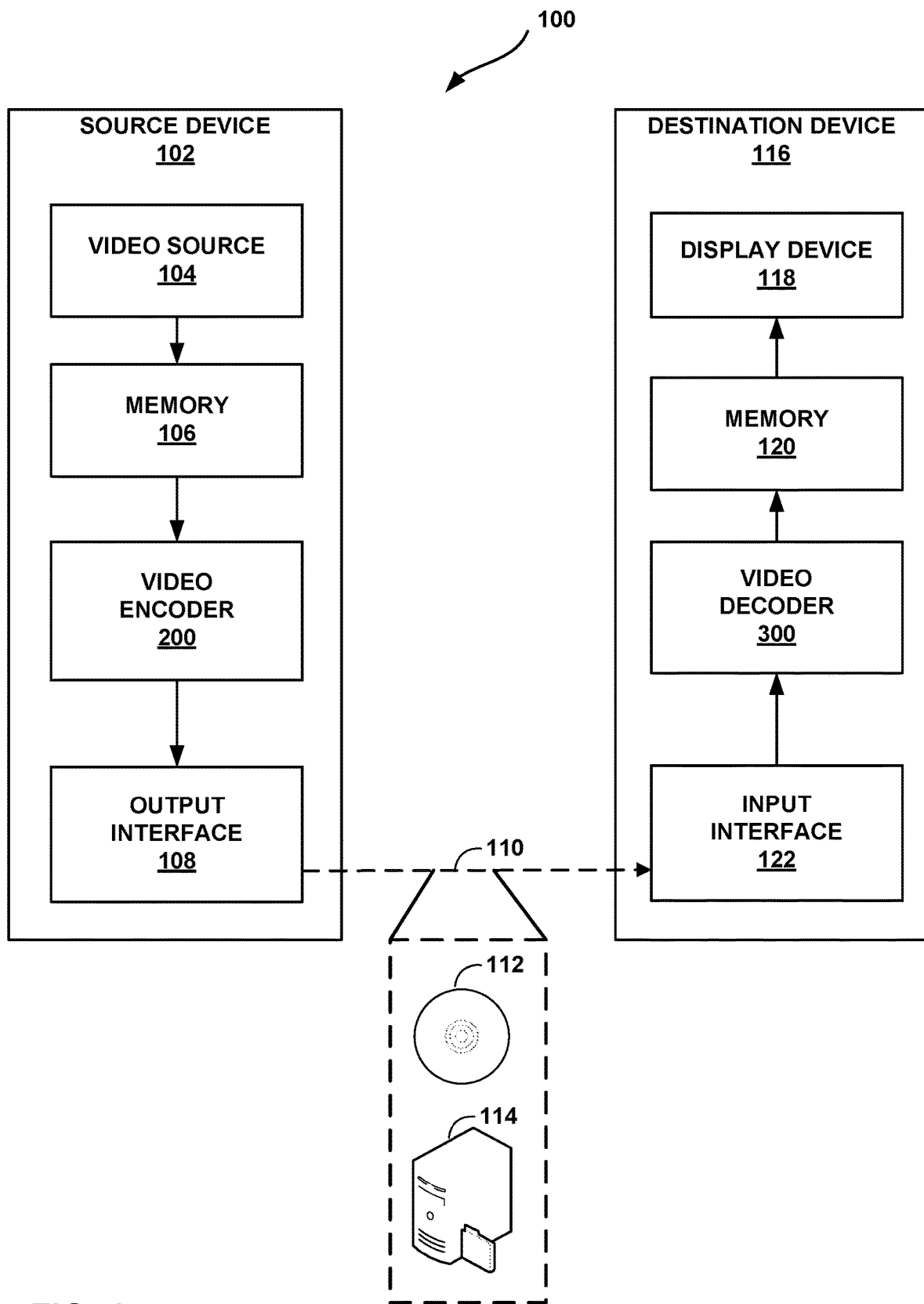
FIG. 1 is a block diagram illustrating an example video encoding and decoding system that may perform the techniques of this disclosure.

In HEVC, motion vector differences (MVDs) (between the motion vector and predicted motion vector of a prediction unit (PU)) are signalled in units of quarter luma samples when use_integer_mv_flag is equal to 0 in the slice header. However, in Joint Exploration Test Model (JEM) draft 7 (Algorithm Description of Joint Exploration Test Model 7 (JEM 7), Joint Video Exploration Team (JVET) of ITU-T SG 16 WP 3 and ISO/IEC JTC 1/SC 29/WG 11, 7th Meeting: Torino, IT, 13-21 Jul. 2017, Document: JVET-G1001-v1 available at http://phenix.it-sudparis.eu/jvet/doc_end_user/documents/7_Torino/wg11/JVET-G1001-v1.zip, hereinafter "JEM7"), a locally adaptive motion vector resolution (LAMVR) is introduced. In JEM7, a video coder (e.g., video encoder or video decoder) may code an MVD in units of quarter luma sample precision, integer luma sample precision, or four luma sample precision. Before adding the MVD to the selected motion vector predictor (MVP) for the constructed motion vector (MV), a video coder (e.g., video encoder 200 and/or video decoder 300 as discussed below) rounds the MVP to the same precision as the MVD. Also, in JEM7, the precision for motion vector storage is increased (by 2). The MVP that the video coder fetches from the motion vector buffer may need to be rounded to the precision of a quarter luma sample before adding MVD. Therefore, the video coder may perform two rounding processes if the MVD is not quarter luma sample precision.

The values of MV or MVP are usually represented by integer numbers, and the precision is represented by a shift. For example, for 1 in unit of quarter luma sample, the shift value may be 2. Given the shift value N, the video coder may perform the rounding process as follows:

The variable RoundingOffset is set equal to 1<<(N−1)
mv[0]=(mv[0]>=0? (mv[0]+RoundingOffset)>>N: −((−mv[0]+RoundingOffset)>>N))<<N
mv[1]=(mv[1]>=0? (mv[1]+RoundingOffset)>>N: −((−mv[1]+RoundingOffset)>>N))<<N wherein mv[0] is the x component of the MV and mv[1] is the y component of the MV.

As discussed above, the two rounding processes described above may result in rounding errors, which may accumulate. The following example illustrates the error:

The default unit is in quarter luma sample precision and the MV storage is in 1/16 luma sample precision.

The MVP fetched from MV buffer is (7,0) in 1/16 luma sample precision.

The shift N is 2, and the MVP is first rounded to quarter luma sample precision to (8, 0) in 1/16 luma sample precision.

At this point, the rounding error is 1 in 1/16 luma sample precision.

If the MVD is in integer luma sample precision, the value (8,0) is further rounded to (16, 0) in 1/16 luma sample precision.

The rounding error in the 2nd rounding is 8 in 1/16 luma sample precision.

The total rounding error is 9 in 1/16 luma sample precision (16-7) which is accumulated in the two rounding processes.

In accordance with one or more techniques, a video coder may utilize a joint rounding process. To illustrate, a variable ImvShift may indicate the motion vector difference resolution (e.g., the resolution of the MVD as signaled). In some examples, the value of ImvShift may indicate the MVD resolution such that 1<<ImvShift represents the number of units in quarter luma sample precision. For example, ImvShift equal to 0 indicates quarter luma sample precision, ImvShift equal to 1 indicates integer luma sample precision, and ImvShift equal to 2 indicates four luma sample precision.

A variable MvStorageShift may indicate the increased MV precision in storage, such that 1/(1<<MvStorageShift) represents the MV precision in unit of quarter luma sample precision. For example, MvStorageShift equal to 2 indicates the MV precision in storage is increased from quarter luma sample precision to 1/16 luma sample precision.

mvpLX[0] denotes the x component of the MVP and mvpLX[1] denotes the y component of the MVP. If the default unit is quarter luma sample precision, the video coder may perform the rounding process for the MVP as follows:

MvShift=ImvShift+MvStorageShift
The variable RoundingOffset is set equal to 1<<(MvShift−1)

mvpLX[0]=(mvpLX[0]>=0? (mvpLX[0]+RoundingOffset)>>MvShift: −((−mvpLX[0]+RoundingOffset)>>MvShift))<<ImvShift mvpLX[1]=(mvpLX[1]>=0? (mvpLX[1]+RoundingOffset)>>MvShift: −((−mvpLX[1]+RoundingOffset)>>MvShift))<<ImvShift If the default unit is the same as in the MV storage, the video coder may perform the rounding process for the MVP as follows:

MvShift=ImvShift+MvStorageShift

The variable RoundingOffset is set equal to 1<<(MvShift−1)

mvpLX[0]=(mvpLX[0]>=0? (mvpLX[0]+RoundingOffset)>>MvShift: −((−mvpLX[0]+RoundingOffset)>>MvShift))<<MvShift mvpLX[1]=(mvpLX[1]>=0? (mvpLX[1]+RoundingOffset)>>MvShift: −((−mvpLX[1]+RoundingOffset)>>MvShift))<<MvShift In another example, the video coder may round the motion vectors as follows, where MvShift is a variable that depends on the desired rounding precision.

The variable RoundingOffset is set equal to 1<<(MvShift−1)

mvpLX[0]=(mvpLX[0]>=0? (mvpLX[0]+RoundingOffset−1)>>MvShift: −((−mvpLX[0]+RoundingOffset)>>MvShift))<<MvShift mvpLX[1]=(mvpLX[1]>=0? (mvpLX[1]+RoundingOffset−1)>>MvShift: −((−mvpLX[1]+RoundingOffset)>>MvShift))<<MvShift Given the same example above, (7,0) is rounded to (0,0) by the proposed joint rounding process. The rounding error is 7 in 1/16 luma sample precision instead of 9. Therefore, by performing the joint rounding process as described in this disclosure, the video coder may reduce the error introduced when rounding motion vectors. By enabling the video coder to reduce the amount of error introduced, the techniques of this disclosure may improve the efficiency of video compression (e.g., reduce the bitrate).

In some examples, the negative value of a vector (e.g., a motion vector predictor) may be rounded towards 0. Compared with the rounding process described above, the video coder may avoid having to determine the sign of the value of the motion vector being rounded (i.e., the "mvpLX[0] >=0" operation may be avoided), thus reducing complexity. By reducing the complexity of rounding motion vectors, the techniques of this disclosure may enable the video coder to perform the encoding/decoding with reduced computing resources.

If the default unit is quarter luma sample precision, the video coder may perform the rounding process for the MVP as follows:

MvShift=ImvShift+MvStorageShift

The variable RoundingOffset is set equal to 1<<(MvShift−1)

mvpLX[0]=((mvpLX[0]+RoundingOffset)>>MvShift)<<ImvShift mvpLX[1]=((mvpLX[1]+RoundingOffset)>>MvShift)<<ImvShift If the default unit is the same as in the MV storage, the video coder may perform the rounding process for the MVP as follows:

MvShift=ImvShift+MvStorageShift

The variable RoundingOffset is set equal to 1<<(MvShift−1)

mvpLX[0]=((mvpLX[0]+RoundingOffset)>>MvShift)<<MvShift mvpLX[1]=((mvpLX[1]+RoundingOffset)>>MvShift)<<MvShift In some examples, the video coder may perform the joint rounding operation to each possible MVP before the MVP is considered to be added to the MVP candiate list. In this way, the rounding process may be performed before a pruning process of the MVP candidate list (e.g., where candidate MVPs, such as redundant MVPs, are removed from a MVP candidate list). In examples where joint rounding operation is performed before adding MVP to MVP candidate list, the pruning process is performed on the rounded MVP. In other examples, the video coder may perform the joint rounding operation to the selected MVP after the MVP candidate list is constructed. Therefore, the pruning process may be performed on the MVP before rounding.

In accordance with one or more techniques of this disclosure, the video coder may utilize a unified rounding process for all motion vector rounding operations. For instance, the video coder may utilize the above-described rounding process in adaptive motion vector resolution and increased MV resolution. In some examples, the video coder may apply the same rounding process when in the affine motion vector derivation process, the temporal motion vector predictor derivation process, MV scaling according to the picture order count of the current picture and reference pictures, etc.

By utilizing a unified (i.e., the same) rounding procedure for all the rounding processes, the complexity of the video coder may be reduced. For instance, the same functional/module can be used for all motion vector rounding operations. In some examples, the only difference between rounding may be the input shifting number, denoted as MvShift.

In one example, the video coder may perform the unified rounding procedure as follows:

The variable RoundingOffset is set equal to 1<<(MvShift−1)

mvpLX[0]=(mvpLX[0]>=0? (mvpLX[0]+RoundingOffset−1)>>MvShift: −((−mvpLX[0]+RoundingOffset)>>MvShift))<<MvShift mvpLX[1]=(mvpLX[1]>=0? (mvpLX[1]+RoundingOffset−1)>>MvShift: −((−mvpLX[1]+RoundingOffset)>>MvShift))<<MvShift In another example, the video coder may perform the unified rounding procedure as follows:

The variable RoundingOffset is set equal to 1<<(MvShift−1)

mvpLX[0]=(mvpLX[0]>=0? (mvpLX[0]+RoundingOffset)>>MvShift: −((−mvpLX[0]+RoundingOffset)>>MvShift))<<MvShift mvpLX[1]=(mvpLX[1]>=0? (mvpLX[1]+RoundingOffset)>>MvShift: −((−mvpLX[1]+RoundingOffset)>>MvShift))<<MvShift In another example, the video coder may perform the unified rounding procedure as follows:

The variable RoundingOffset is set equal to 1<<(MvShift−1)

mvpLX[0]=((mvpLX[0]+RoundingOffset)>>MvShift)<<MvShift mvpLX[1]=((mvpLX[1]+RoundingOffset)>>MvShift)<<MvShift FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for performing adaptive motion vector difference resolution with increased precision of stored motion vectors. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for performing adaptive motion vector difference resolution with increased precision of stored motion vectors. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 includes video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 116. Similarly, destination device 116 may access encoded data from storage device 116 via input interface 122. Storage device 116 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM. According to JEM, a video coder (such as video encoder 200) partitions a picture into a plurality of coding tree units (CTUs). Video encoder 200 may partition a CTU according to a tree structure, such as a quadtree-binary tree (QTBT) structure. The QTBT structure of JEM removes the concepts of multiple partition types, such as the separation between CUs, PUs, and TUs of HEVC. A QTBT structure of JEM includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In some examples, video encoder 200 and video decoder 300 may use a single QTBT structure to represent each of the luminance and chrominance components, while in other examples, video encoder 200 and video decoder 300 may use two or more QTBT structures, such as one QTBT structure for the luminance component and another QTBT structure for both chrominance components (or two QTBT structures for respective chrominance components).

Video encoder 200 and video decoder 300 may be configured to use quadtree partitioning per HEVC, QTBT partitioning according to JEM, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

JEM also provides an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. JEM provides sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, video encoder 200 and/or video decoder 300 may reduce error introduced when rounding motion vectors (e.g., when performing adaptive motion vector difference resolution with increased precision of stored motion vectors). For instance, video decoder 300 may decode, from a coded video bitstream, a value of a motion vector difference (MVD) for a current block of video data. Video decoder 300 may obtain, from a motion vector buffer, a value of a motion vector predictor (MVP) for a current block of video data.

As discussed above, various motion vectors, MVPs, and MVDs may be signaled/stored or otherwise represented at different resolutions/precisions. For example, MVD can be coded in units of quarter luma samples, integer luma samples or four luma samples (e.g., quarter luma sample precision, integer luma sample precision, or four luma sample precision). As a motion vector is calculated as a sum of a MVP and a MVD, it may be necessary for video decoder 300 to round a value of the MVP and/or a value of the MVD when calculating the value of a motion vector. These rounding operations may introduce error, which is undesirable. This disclosure provides techniques for reducing the amount of error introduced by removing at least one rounding operation that otherwise would be performed (e.g., where removal of the at least one rounding operation may be accomplished by performing a joint rounding process). The joint rounding process may be considered "joint" in that it can generate a result of two rounding operations in a single rounding operation, which introduces less error than the two rounding operations.

To perform the joint rounding process, video decoder 300 may determine a resolution of the value of the motion vector difference for the current block, and determine a storage resolution shift amount for motion vectors. For example, video decoder 300 may determine the resolution of the value of the MVD based on a LAMVR flag. Video decoder 300 may determine the storage resolution shift amount either as a constant for all video data or adaptively for the current picture or block. For instance, where the video data is encoded in accordance with JEM, video decoder 300 may determine that the precision for motion vector storage is increased by 2 bits (e.g., relative to the signaled precision of the MVDs).

Video decoder 300 may round the value of the motion vector predictor obtained from the motion vector buffer based on the resolution of the value of the motion vector difference and the storage resolution shift amount. For instance, video decoder 300 may determine a first shift value (e.g., MvShift) based on the resolution of the value of the motion vector difference and the storage resolution shift amount. Video decoder 300 may right-shift, by the first shift value, the value of the motion vector predictor obtained from the motion vector buffer plus a rounding offset (e.g., mvpLX[0]>=0? (mvpLX[0]+RoundingOffset)>>MvShift: −((−mvpLX[0]+RoundingOffset)>>MvShift)). Video decoder 300 may left-shift the right-shifted value of the motion vector predictor by a second shift value (e.g., ImvShift or MvShift) to obtain the rounded value of the motion vector predictor.

Video decoder 300 may select the second shift value based on whether a default resolution for the block of video data is the same as a storage resolution for the block of video data. As one example, where the default resolution is not the same as the storage resolution, video decoder 300 may select the second shift value as the resolution of the value of the motion vector difference. As another example, where the default resolution is the same as the storage resolution (e.g., where the default unit is quarter luma samples), video decoder 300 may select the second shift value as the first shift value (e.g., first shift value=second shift value=MvShift).

Video decoder 300 may utilize the rounded value of the motion vector predictor to reconstruct samples of the current block. For instance, video decoder 300 may add the rounded value of the motion vector predictor to the value of the motion vector difference to obtain a value of a motion vector for the current block; obtain, based on the motion vector for the current block, samples of a predictor block for the current block from a reference picture buffer; and reconstruct the samples of the current block based on the samples of the predictor block for the current block.

Video encoder 200 may utilize the joint rounding process in a similar manner (e.g., in a reconstruction loop). In this way, video encoder 200 and/or video decoder 300 may reduce the amount of error introduced. Reducing the amount of error introduced may result in more accurate predictions, which may result in smaller residual data. As such, the techniques of this disclosure enable improved compression of video data.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2:
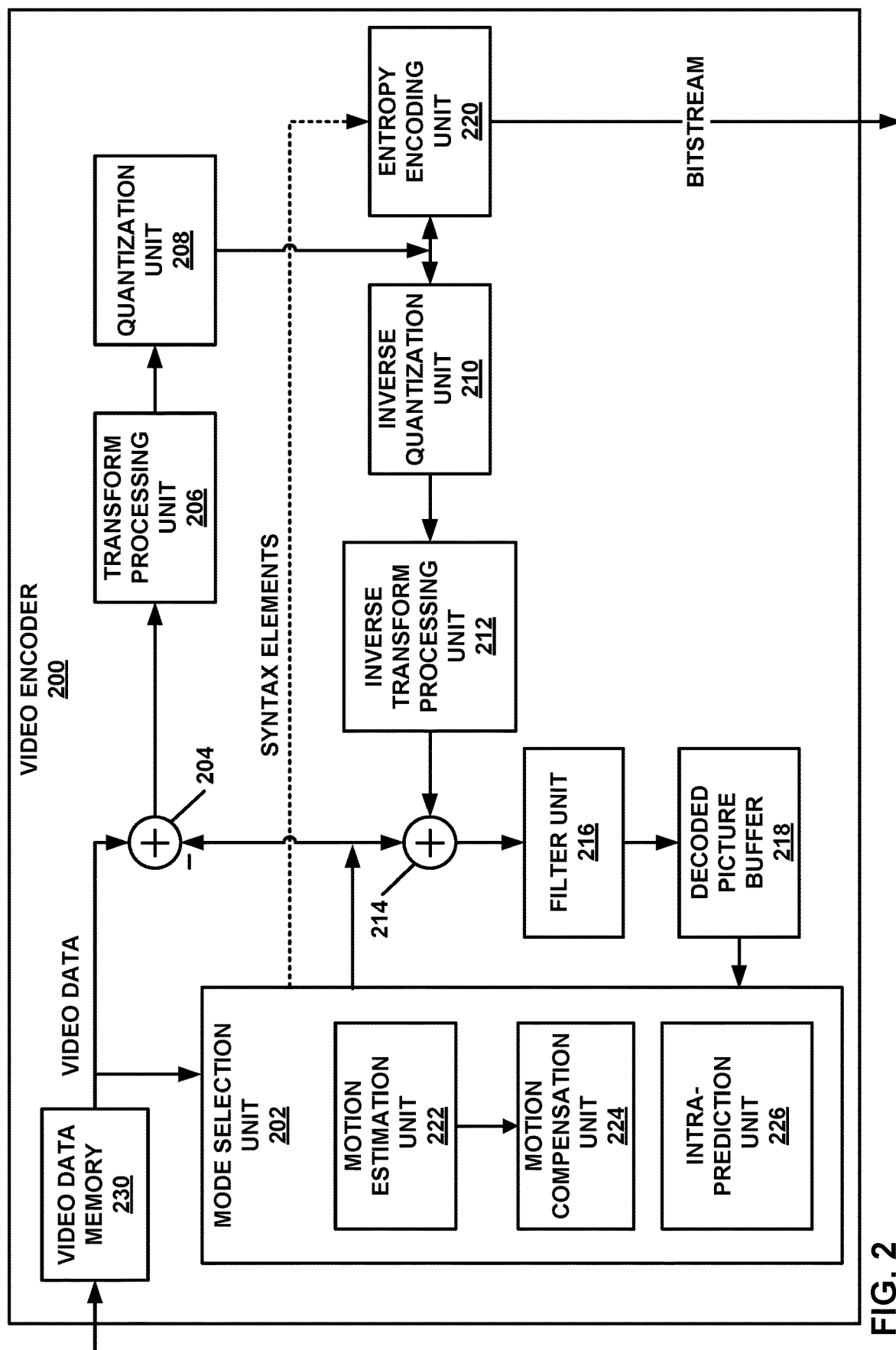
FIG. 2 is a block diagram illustrating an example video encoder that may perform the techniques of this disclosure.

FIG. 2 is a block diagram illustrating an example video encoder 200 that may perform the techniques of this disclosure. FIG. 2 is provided for purposes of explanation and should not be considered limiting of the techniques as broadly exemplified and described in this disclosure. For purposes of explanation, this disclosure describes video encoder 200 in the context of video coding standards such as the HEVC video coding standard and the versatile video coding (VVC) standard presently in development, which may become the ITU-T H.266 standard. However, the techniques of this disclosure are not limited to these video coding standards, and are applicable generally to video encoding and decoding.

In the example of FIG. 2, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Additionally or alternatively, DBP 218 may include a motion vector buffer that stores motion vectors for blocks of video data (e.g., that may be used to predict motion vectors for other blocks of video data). Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 2 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni- directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

As discussed above, motion estimation unit 222 may form a motion vector (MV) for a current block that defines a position of a reference block relative to the current block. Motion estimation unit 222 may generate one or more syntax elements with values to encode the value of the MV for the current block. For instance, motion estimation unit 222 may generate syntax elements that enable a video decoder (i.e., video decoder 300 of FIG. 3) to reconstruct the value of the MV for the current block based on a motion vector predictor (MVP) and a motion vector difference (MVD). Motion estimation unit 222 may obtain the MVP based on a MV of a previously coded block or one or more default values. In some examples, motion estimation unit 222 may obtain a plurality of candidate MVPs from various sources (e.g., MVs of spatial neighboring blocks, MVs of temporal neighboring blocks, and default values).

Motion estimation unit 222 may select the MVP from the plurality of candidate MVPs that most closely matches the MV for the current block. Motion estimation unit 222 may calculate a difference between the MV for the current block and the selected MVP. Motion estimation unit 222 may generate syntax elements that indicate the selected MVP (e.g., an index into a list of candidate MVPs) and syntax elements that indicate the value of the MVD. Entropy encoding unit 220 may encode the generated syntax elements into the bitstream.

As discussed above and in accordance with one or more techniques of this disclosure, motion estimation unit 222 may perform a joint rounding process when determining motion vectors. For instance, as opposed to first rounding a value of an MVP from storage resolution to the default unit resolution and then rounding the result to the resolution of the MVD, motion estimation unit 222 may round the MVP once based on the resolution of the MVD and the storage resolution. In this way, motion estimation unit 222 may reduce the error introduced when determining motion vectors. By reducing the error introduced, motion estimation unit 222 may reduce the number of bits used to represent the video data, yielding improved compression.

In this manner, video encoder 200 represents an example of a video encoding device including a memory configured to store video data, and one or more processing units implemented in circuitry and configured to determine a value of a motion vector difference for a current block of video data; obtain, from a motion vector buffer, a value of a motion vector predictor for the current block of video data; determine a resolution of the value of the motion vector difference for the current block; obtain a storage resolution shift amount for motion vectors; round the value of the motion vector predictor obtained from the motion vector buffer based on the resolution of the value of the motion vector difference and the storage resolution shift amount; add the rounded value of the motion vector predictor to the value of the motion vector difference to obtain a value of a motion vector for the current block; obtain, based on the motion vector for the current block, samples of a predictor block for the current block; and reconstruct samples of the current block based on the samples of the predictor block for the current block.

Figure 3:
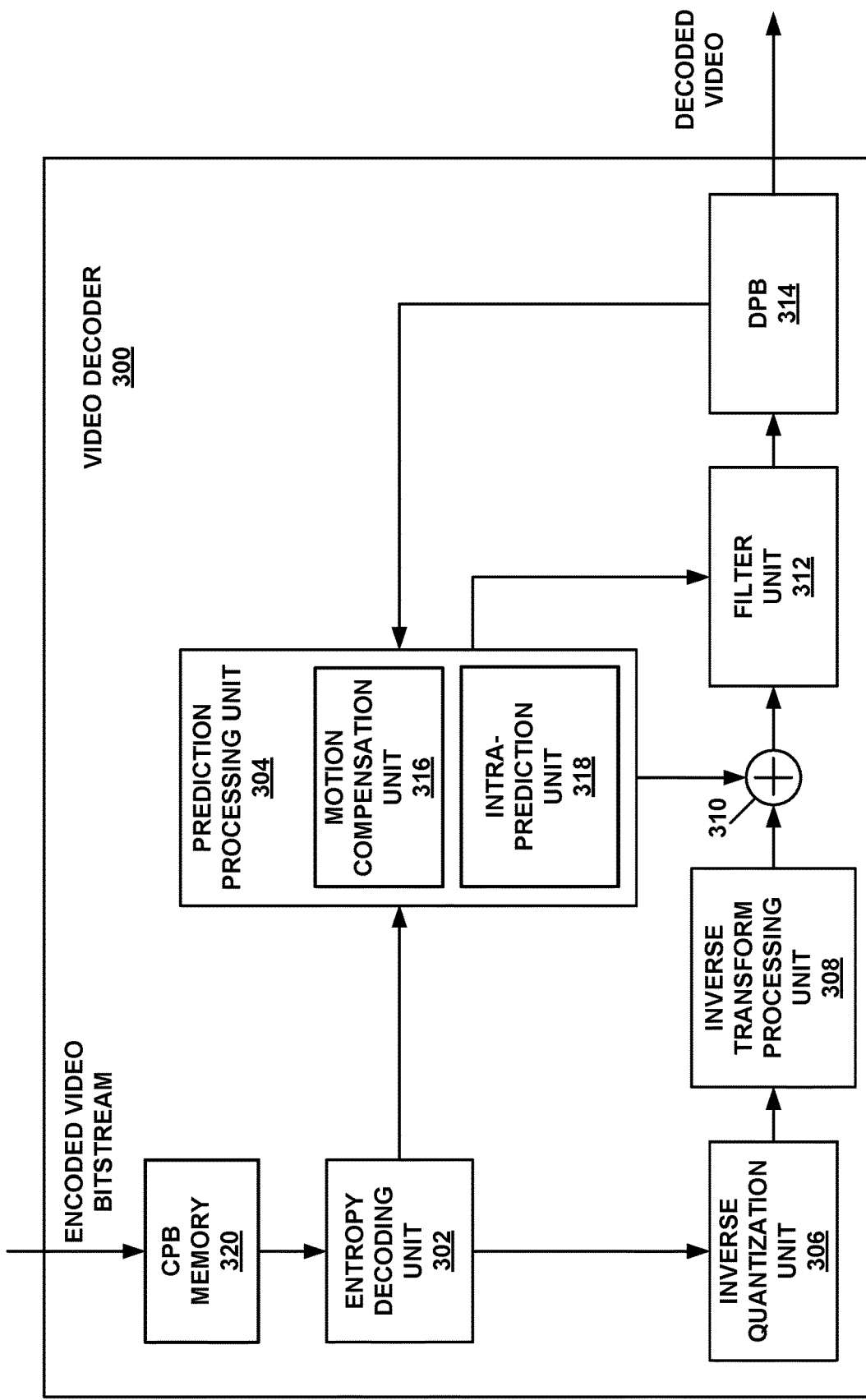
FIG. 3 is a block diagram illustrating an example video decoder that may perform the techniques of this disclosure.

FIG. 3 is a block diagram illustrating an example video decoder 300 that may perform the techniques of this disclosure. FIG. 3 is provided for purposes of explanation and is not limiting on the techniques as broadly exemplified and described in this disclosure. For purposes of explanation, this disclosure describes video decoder 300 is described according to the techniques of JEM and HEVC. However, the techniques of this disclosure may be performed by video coding devices that are configured to other video coding standards.

In the example of FIG. 3, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 3 are illustrated to assist with understanding the operations performed by video decoder 300. The units may be implemented as fixed-function circuits, programmable circuits, or a combination thereof. Similar to FIG. 2, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 2).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 2). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

As discussed above, motion compensation unit 316 may obtain a value of a motion vector (MV) for a current block that defines a position of a reference block relative to the current block. Motion compensation unit 316 may obtain the value of the motion vector based on a motion vector predictor (MVP) and a motion vector difference (MVD). Motion compensation unit 316 may obtain the MVP based on a MV of a previously coded block or one or more default values. In some examples, motion compensation unit 316 may obtain a plurality of candidate MVPs from various sources (e.g., MVs of spatial neighboring blocks, MVs of temporal neighboring blocks, and default values). Motion compensation unit 316 may obtain the plurality of candidate MVPs in a manner similar to video encoder 200, such that the plurality of candidate MVPs obtained by motion compensation unit 316 match the plurality of candidate MVPs obtained by video encoder 200. Motion compensation unit 316 may obtain the value of the MVD based on one or more syntax elements that indicate the value of the MVD.

As discussed above, the various motion vectors (i.e., MVP, MVD, and MV) may have different resolutions. In some examples, such as where adaptive motion vector resolution (AMVR) is used, the MVD may be signaled in ¼-pel, integer-pel, and quad-pel resolution. In some examples, such as where AMVR is used, the MVP may be stored in ¹⁄₁₆-pel resolution, while the default unit may be ¼-pel resolution.

In order to properly add the values of the MVP and MVD to obtain the MV, motion compensation unit 316 may perform one or more rounding operations. For instance, motion compensation unit 316 may perform a first rounding operation to round the MVP to the default unit. Then, if the MVD is signaled in a resolution that is different than the default unit, motion compensation unit 316 may perform a second rounding operation to round the MVP from the default unit resolution to the resolution of the MVD.

As discussed above and in accordance with one or more techniques of this disclosure, motion compensation unit 316 may perform a joint rounding process when determining motion vectors. For instance, as opposed to first rounding a value of an MVP from storage resolution to the default unit resolution and then rounding the result to the resolution of the MVD, motion compensation unit 316 may round the MVP once based on the resolution of the MVD and the storage resolution. In this way, motion compensation unit 316 may reduce the error introduced when determining motion vectors. By reducing the error introduced, motion compensation unit 316 may reduce the number of bits required to represent the video data, yielding improved compression.

In this manner, video decoder 300 represents an example of a video decoding device including a memory configured to store video data, and one or more processing units implemented in circuitry and configured to decode, from a coded video bitstream, a value of a motion vector difference for a current block of video data; obtain, from a motion vector buffer, a value of a motion vector predictor for the current block of video data; determine a resolution of the value of the motion vector difference for the current block; obtain a storage resolution shift amount for motion vectors; round the value of the motion vector predictor obtained from the motion vector buffer based on the resolution of the value of the motion vector difference and the storage resolution shift amount; add the rounded value of the motion vector predictor to the value of the motion vector difference to obtain a value of a motion vector for the current block; obtain, based on the motion vector for the current block, samples of a predictor block for the current block; and reconstruct samples of the current block based on the samples of the predictor block for the current block.

Figure 4:
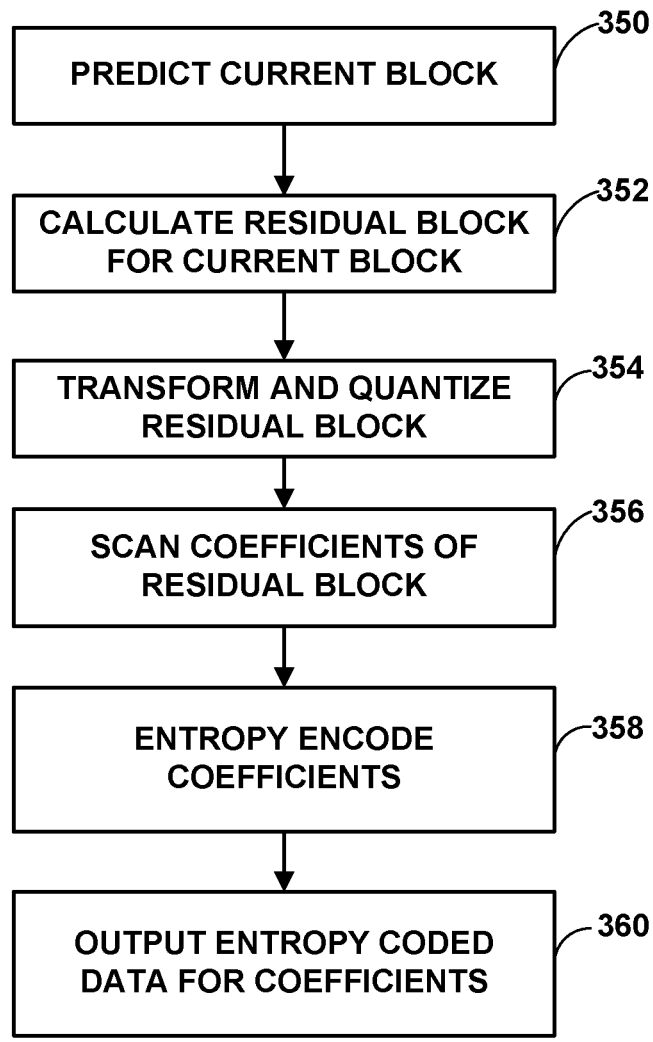
FIG. 4 is a flowchart illustrating an example method for encoding a current block.

FIG. 4 is a flowchart illustrating an example method for encoding a current block. The current block may comprise a current CU. Although described with respect to video encoder 200 (FIGS. 1 and 2), it should be understood that other devices may be configured to perform a method similar to that of FIG. 4.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, uncoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy coded data of the block (360).

Video encoder 200 may decode the encoded current block of video data as part of a reconstruction loop. As part of the decoding, video encoder 200 may perform the joint rounding process described above when determining a value of a motion vector for the current block.

Figure 5:
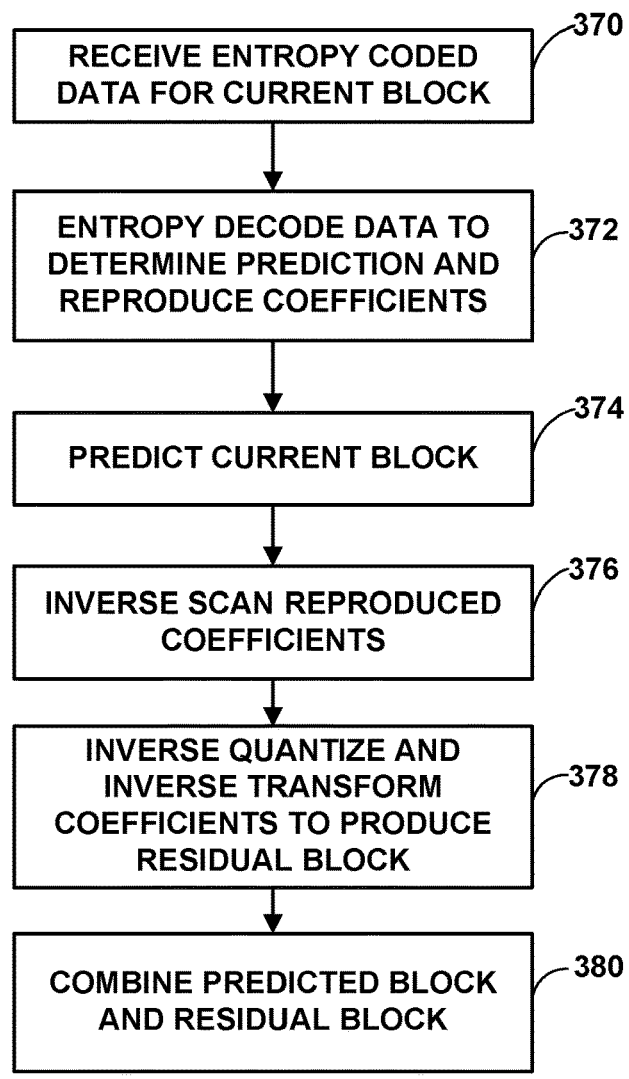
FIG. 5 is a flowchart illustrating an example method for decoding a current block.

FIG. 5 is a flowchart illustrating an example method for decoding a current block of video data. The current block may comprise a current CU. Although described with respect to video decoder 300 (FIGS. 1 and 3), it should be understood that other devices may be configured to perform a method similar to that of FIG. 5.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). For instance, video decoder 300 may determine a value of a motion vector for the current block using the joint rounding process described herein.

Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380).

Figure 6:
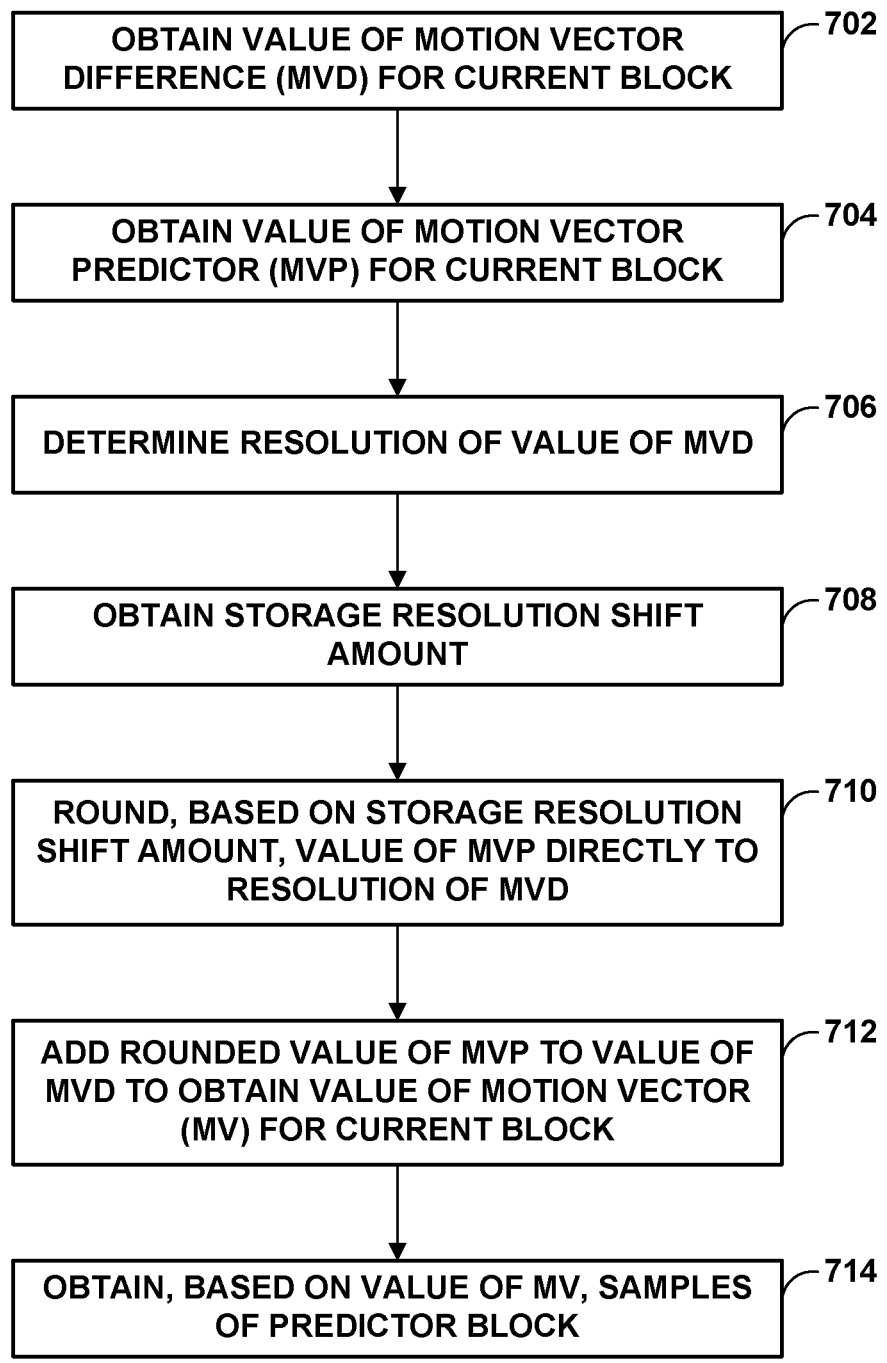
FIG. 6 is a flowchart illustrating an example method for predicting a current block.

FIG. 6 is a flowchart illustrating an example method for predicting a current block of video data. The current block may comprise a current CU. Although described with respect to video decoder 300 (FIGS. 1 and 3), it should be understood that other devices may be configured to perform a method similar to that of FIG. 6. For instance, video encoder 200 may perform the method of FIG. 6 as part of a reconstruction loop.

Video decoder 300 may obtain a value of a motion vector difference (MVD) for a current block (702). For instance, motion compensation unit 316 may obtain (e.g., from entropy decoding unit 302) values of one or more syntax elements that indicate the value of the MVD. As one example, motion compensation unit 316 may obtain a value of a first syntax element that specifies whether the absolute value of the MVD is greater than 0 (e.g., abs_mvd_greater0_flag), a second syntax element that specifies whether the absolute value of the MVD is greater than 1 (e.g., abs_mvd_greater1_flag), a third syntax element that specifies the absolute value of the MVD (e.g., abs_mvd_minus2), and/or a fourth syntax element that specifies the sign of the value of the MVD (e.g., mvd_sign_flag).

Video decoder 300 may obtain a value of a motion vector predictor (MVP) for the current block (704). For instance, motion compensation unit 316 may obtain, from a motion vector buffer, a value of a motion vector (MV) of a previously coded block (e.g., a neighboring block of the current block). The motion vector buffer may store values of motion vectors of previously coded blocks of video data. Video decoder 300 may maintain the motion vector buffer in memory (e.g., as part of DPB 314). In some examples, the MVP may be referred to as a candidate MVP. For instance, motion compensation unit 316 may obtain a plurality of candidate MVPs from the motion vector buffer. Example candidate MVPs include, spatial MVP candidates, temporal MVP candidate, default values, and the like.

Video decoder 300 may determine a resolution of the value of the MVD (706). As discussed above, in some examples, such as where adaptive motion vector resolution (AMVR) is used, the value of the MVD may be signaled (e.g., encoded in the bitstream) at different resolutions (e.g., one of ¼ luma sample, integer luma sample, and quad luma sample resolution). Motion compensation unit 316 may obtain (e.g., from entropy decoding unit 302) values of one or more syntax elements that specify the resolution of the value of the MVD (e.g., ImvShift).

Video decoder 300 may obtain a storage resolution shift amount (708). For instance, motion compensation unit 316 may determine the resolution at which motion vectors are stored (e.g., in the motion vector buffer) relative to a resolution of a default unit. For example, motion compensation unit 316 may determine a value of a variable that specifies the increased motion vector resolution in storage (e.g., MvStorageShift). In some examples, 1/(1<<MvStorageShift) may represent the MV precision in unit of quarter luma sample precision. For example, MvStorageShift equals 2 indicates the MV resolution/precision in storage is increased from quarter luma sample precision to ¹⁄₁₆ luma sample precision. In some examples, the value of the variable that specifies the increased motion vector resolution in storage may be coded in the bitstream. In some examples, the value of the variable that specifies the increased motion vector resolution in storage may be predetermined. For instance, the value of the variable that specifies the increased motion vector resolution in storage may be predetermined to be 2 where the MV resolution/precision in storage is increased from quarter luma sample precision (e.g., the default unit resolution) to ¹⁄₁₆ luma sample precision.

Video decoder 300 may round, based on the storage resolution shift amount, the value of the MVP directly to the resolution of the MVD (710). For instance, as opposed to first rounding the value of the MVP to the resolution of the default unit and then re-rounding the first rounded value of the MVP to the resolution of the MVD, motion compensation unit 316 may perform a single rounding operation to round the value of the MVP directly from the resolution at which it is stored to the resolution of the MVD. As one example, motion compensation unit 316 may round the value of the MVP in accordance with the following equations where ImvShift represents the resolution of the value of the MVD and MvStorageShift represents the increased motion vector resolution in storage:

MvShift=ImvShift+MvStorageShift

The variable RoundingOffset is set equal to 1<<(MvShift−1)

mvpLX[0]=(mvpLX[0]>=0? (mvpLX[0]+RoundingOffset)>>MvShift: −((−mvpLX[0]+RoundingOffset)>>MvShift))<<MvShift mvpLX[1]=(mvpLX[1]>=0? (mvpLX[1]+RoundingOffset)>>MvShift: −((−mvpLX[1]+RoundingOffset)>>MvShift))<<MvShift As shown above, in some examples, motion compensation unit 316 may evaluate a sign of the value of the MVP as part of the rounding process to determine whether to round towards 0 or away from zero. In particular, as shown above, motion compensation unit 316 evaluates whether the value of the MVP is greater than or equal to zero (i.e., mvpLX[0]>=0) to determine whether to round by (mvpLX[0]+RoundingOffset)<<MvShift or by −((−mvpLX[0]+RoundingOffset)>>MvShift))<<MvShift. In some examples, motion compensation unit 316 may perform the joint rounding process while always rounding towards 0. For instance, motion compensation unit 316 may round the value of the MVP in accordance with the following equations where ImvShift represents the resolution of the value of the MVD and MvStorageShift represents the increased motion vector resolution in storage:

MvShift=ImvShift+MvStorageShift

The variable RoundingOffset is set equal to 1<<(MvShift−1)

mvpLX[0]=((mvpLX[0]+RoundingOffset)>>MvShift)<<MvShift mvpLX[1]=((mvpLX[1]+RoundingOffset)>>MvShift)<<MvShift In this way, video decoder 300 may avoid using two different rounding techniques based on the sign of the value of the MVP. As such, the techniques of this disclosure may reduce the complexity of the rounding process.

Video decoder 300 may add the rounded value of the MVP to the value of the MVD to obtain a value of a motion vector for the current block (712). For instance, with the values of the MVP and MVD being in the same resolution, motion compensation unit 316 may add the values of the MVP and MVD to obtain the value of the MV for the current block.

Video decoder 300 may obtain, based on the value of the MV, samples of a predictor block (714). For instance, motion compensation unit 316 may obtain samples of a predictor block identified by the MV for the current block. As discussed above with reference to FIG. 5, video decoder 300 may obtain the samples of the predictor block in step 374 of FIG. 5. Video decoder 300 may reconstruct samples of the current block based on the samples of the predictor block. For instance, as shown in block 380 of FIG. 5, video decoder 300 may form a residual block and combine samples of the residual block with samples of the predictor block to obtain reconstructed samples of the current block.

As discussed above, in some examples, motion compensation unit 316 may obtain a plurality of candidate MVPs from the motion vector buffer. In some examples, motion compensation unit 316 may perform a pruning process on the plurality of candidate MVPs (e.g., to remove duplicates). Motion compensation unit 316 may perform the pruning process at various points. As one example, motion compensation unit 316 may perform the pruning process before rounding the values of the MVPs. For instance, motion compensation unit 316 may perform the pruning process on the rounded values of the candidate MVPs to generate a MVP candidate list. As another example, motion compensation unit 316 may perform the pruning process after rounding the values of the MVPs. For instance, motion compensation unit 316 may perform the pruning process on the unrounded values of the candidate MVPs to generate a MVP candidate list, and then perform the rounding process on the MVPs in the MVP candidate list.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or

What is claimed is:

1. A method of coding video data, the method comprising:
   coding a value of a motion vector difference for a current block of video data;
   obtaining, from a motion vector buffer, a value of a motion vector predictor for the current block of video data;
   obtaining a shift value that is based on a resolution of the value of the motion vector difference and based on a storage resolution shift amount for motion vectors;
   rounding, based on the shift value, the value of the motion vector predictor obtained from the motion vector buffer directly to the resolution of the value of the motion vector difference, wherein the rounding comprises:
      right-shifting, by the shift value, a value representing a sum of the value of the motion vector predictor obtained from the motion vector buffer and a rounding offset; and
      left-shifting, by the shift value, the right-shifted value representing the sum of the motion vector predictor and the rounding offset to obtain the rounded value of the motion vector predictor;
   adding the rounded value of the motion vector predictor to the value of the motion vector difference to obtain a value of a motion vector for the current block;
   obtaining, based on the value of the motion vector for the current block, samples of a predictor block for the current block; and
   reconstructing samples of the current block based on the samples of the predictor block for the current block.

2. The method of claim 1, further comprising determining the rounding offset as one left-shifted by a difference of the shift value and 1.

3. The method of claim 1, wherein determining the shift value comprises adding a value that represents the resolution of the value of the motion vector difference to a value that represents the storage resolution shift amount to obtain the shift value.

4. The method of claim 3, wherein the value representing the storage resolution shift amount is 2.

5. The method of claim 4, wherein the value that represents the resolution of the value of the motion vector difference indicates whether the resolution of the value of the motion vector difference is one of quarter luma sample precision, integer luma sample precision, or four luma sample precision.

6. The method of claim 1, wherein rounding the value of the motion vector predictor obtained from the motion vector buffer comprises rounding towards zero.

7. The method of claim 1, wherein the motion vector predictor is a first motion vector predictor, the method further comprising:
   obtaining, from the motion vector buffer, values of a plurality of candidate motion vector predictors for the current block of video data, wherein the plurality of candidate motion vector predictors includes the first motion vector predictor,
   wherein rounding the value of the first motion vector predictor obtained from the motion vector buffer comprises rounding the values of the plurality of candidate motion vector predictors obtained from the motion vector buffer directly to the resolution of the value of the motion vector difference; and
   performing a pruning process on the rounded values of the candidate motion vector predictors to generate a motion vector predictor candidate list.

8. The method of claim 1, wherein the motion vector predictor is a first motion vector predictor, the method further comprising:
   obtaining, from the motion vector buffer, values of a plurality of candidate motion vector predictors for the current block of video data, wherein the plurality of candidate motion vector predictors includes the first motion vector predictor;
   performing a pruning process on the values of the plurality of candidate motion vector predictors obtained from the motion vector buffer to generate a candidate motion vector predictor candidate list, wherein the motion vector predictor candidate list includes the first motion vector predictor;
   wherein rounding the value of the first motion vector predictor obtained from the motion vector buffer comprises rounding the values of the plurality of candidate motion vector predictors included in the motion vector predictor candidate list directly to the resolution of the value of the motion vector difference.

9. The method of claim 1, wherein rounding the value of the motion vector predictor obtained from the motion vector buffer comprises rounding the value of the motion vector predictor obtained from the motion vector buffer in accordance with a unified rounding process for all motion vector rounding operations.

10. The method of claim 1, wherein coding comprises decoding, the method further comprising:
    obtaining, from the coded video bitstream, residual values for the current block, wherein reconstructing the samples of the current block comprises adding the residual values for the current block to the samples of the predictor block.

11. The method of claim 1, wherein coding comprises encoding, the method further comprising:
    encoding, in the coded video bitstream, residual values for the current block, wherein reconstructing the samples of the current block comprises adding the residual values for the current block to the samples of the predictor block.

12. The method of claim 1, wherein rounding the value of the motion vector predictor obtained from the motion vector buffer directly to the resolution of the value of the motion vector difference comprises:
    performing a single rounding operation to round the value of the motion vector predictor obtained from the motion vector buffer from a storage resolution to the resolution of the value of the motion vector difference.

13. A video coding device comprising:
    a memory configured to store video data; and
    one or more processing units implemented in circuitry and configured to:
       code a value of a motion vector difference for a current block of video data;
       obtain, from a motion vector buffer, a value of a motion vector predictor for the current block of video data;
       obtain a shift value that is based on a resolution of the value of the motion vector difference and based on a storage resolution shift amount for motion vectors;
       round, based on the shift value, the value of the motion vector predictor obtained from the motion vector buffer directly to the resolution of the value of the motion vector difference, wherein, to round the value of the motion vector predictor, the one or more processing units are configured to:
- right-shift, by the shift value, a value representing a sum of the value of the motion vector predictor obtained from the motion vector buffer and a rounding offset and
- left-shift, by the shift value, the right-shifted value representing the sum of the motion vector predictor and the rounding offset to obtain the rounded value of the motion vector predictor;

add the rounded value of the motion vector predictor to the value of the motion vector difference to obtain a value of a motion vector for the current block;

obtain, based on the value of the motion vector for the current block, samples of a predictor block for the current block; and reconstruct samples of the current block based on the samples of the predictor block for the current block.

14. The device of claim 13, wherein the one or more processing units are configured to determine the rounding offset as one left-shifted by a difference of the shift value and 1.

15. The device of claim 13, wherein, to determine the shift value, the one or more processing units are configured to add a value that represents the resolution of the value of the motion vector difference to a value that represents the storage resolution shift amount to obtain the shift value.

16. The device of claim 15, wherein the value representing the storage resolution shift amount is 2.

17. The device of claim 16, wherein the value that represents the resolution of the value of the motion vector difference indicates whether the resolution of the value of the motion vector difference is one of quarter luma sample precision, integer luma sample precision, or four luma sample precision.

18. The device of claim 13, wherein, to round the value of the motion vector predictor obtained from the motion vector buffer, the one or more processing units are configured to round the value of the motion vector predictor obtained from the motion vector buffer towards zero.

19. The device of claim 13, wherein the motion vector predictor is a first motion vector predictor, the one or more processing units being configured to:
- obtain, from the motion vector buffer, values of a plurality of candidate motion vector predictors for the current block of video data, wherein the plurality of candidate motion vector predictors includes the first motion vector predictor,
- wherein, to round the value of the first motion vector predictor obtained from the motion vector buffer, the one or more processing units are configured to round the values of the plurality of candidate motion vector predictors obtained from the motion vector buffer directly to the resolution of the value of the motion vector difference; and
- perform a pruning process on the rounded values of the candidate motion vector predictors to generate a motion vector predictor candidate list.

20. The device of claim 13, wherein the motion vector predictor is a first motion vector predictor, the one or more processing units being configured to:
- obtain, from the motion vector buffer, values of a plurality of candidate motion vector predictors for the current block of video data, wherein the plurality of candidate motion vector predictors includes the first motion vector predictor;
- perform a pruning process on the values of the plurality of candidate motion vector predictors obtained from the motion vector buffer to generate a candidate motion vector predictor candidate list, wherein the motion vector predictor candidate list includes the first motion vector predictor;
- wherein, to round the value of the first motion vector predictor obtained from the motion vector buffer, the one or more processing units are configured to round the values of the plurality of candidate motion vector predictors included in the motion vector predictor candidate list directly to the resolution of the value of the motion vector difference.

21. The device of claim 13, wherein, to round the value of the motion vector predictor obtained from the motion vector buffer, the one or more processing units are configured to round the value of the motion vector predictor obtained from the motion vector buffer in accordance with a unified rounding process for all motion vector rounding operations.

22. The device of claim 13, wherein the video coding device comprises a video decoding device, the one or more processing units being configured to:
- obtain, from a coded video bitstream, residual values for the current block, wherein, to reconstruct the samples of the current block, the one or more processing units are configured to add the residual values for the current block to the samples of the predictor block.

23. The device of claim 22, further comprising a display configured to display the reconstructing the samples of the current block.

24. The device of claim 13, wherein the video coding device comprises a video encoding device, the one or more processing units being configured to:
- encode, in a coded video bitstream, residual values for the current block, wherein, to reconstruct the samples of the current block, the one or more processing units are configured to add the residual values for the current block to the samples of the predictor block.

25. The device of claim 24, wherein the device is a wireless communication device, the device further comprising a camera configured to capture the video data.

26. The device of claim 13, wherein, to round the value of the motion vector predictor obtained from the motion vector buffer directly to the resolution of the value of the motion vector difference, the one or more processing units are configured to:
- perform a single rounding operation to round the value of the motion vector predictor obtained from the motion vector buffer from a storage resolution to the resolution of the value of the motion vector difference.

27. A non-transitory computer-readable storage medium storing instructions that, when executed, cause one or more processors to:
- code a value of a motion vector difference for a current block of video data;
- obtain, from a motion vector buffer, a value of a motion vector predictor for the current block of video data;
- obtain a shift value that is based on a resolution of the value of the motion vector difference and based on a storage resolution shift amount for motion vectors;
- round, based on the shift value, the value of the motion vector predictor obtained from the motion vector buffer directly to the resolution of the value of the motion vector difference, wherein the instructions that cause the one or more processors to round the value of the motion vector predictor comprise instructions that cause the one or more processors to:

right-shift, by the shift value, a value representing a sum of the value of the motion vector predictor obtained from the motion vector buffer and a rounding offset and left-shift, by the shift value, the right-shifted value representing the sum of the motion vector predictor and the rounding offset to obtain the rounded value of the motion vector predictor;

add the rounded value of the motion vector predictor to the value of the motion vector difference to obtain a value of a motion vector for the current block;

obtain, based on the value of the motion vector for the current block, samples of a predictor block for the current block; and reconstruct samples of the current block based on the samples of the predictor block for the current block.

* * * * *